(12) United States Patent
Communal et al.

(10) Patent No.: US 7,730,910 B2
(45) Date of Patent: Jun. 8, 2010

(54) SHED-FORMING DEVICE INCORPORATING ELECTRIC MOTOR UNITS AND WEAVING LOOM EQUIPPED WITH SUCH A DEVICE

(75) Inventors: Sébastien Communal, Duingt (FR); Sylvain Puget, Seythenex (FR)

(73) Assignee: Staubli Faverges, Faverges (FR)

( * ) Notice: Subject to any disclaimer, the term of this patent is extended or adjusted under 35 U.S.C. 154(b) by 205 days.

(21) Appl. No.: 12/010,650

(22) Filed: Jan. 28, 2008

(65) Prior Publication Data

US 2008/0178960 A1 Jul. 31, 2008

(30) Foreign Application Priority Data

Jan. 31, 2007 (FR) ................................. 07 00670

(51) Int. Cl.
*D03C 3/20* (2006.01)
*D03C 3/42* (2006.01)
*D03C 13/00* (2006.01)

(52) U.S. Cl. .................... 139/55.1; 139/76; 139/102; 139/84

(58) Field of Classification Search ................ 139/1 E, 139/35, 55.1, 56, 66 R, 76, 66 A, 102, 82–84, 139/455

See application file for complete search history.

(56) References Cited

U.S. PATENT DOCUMENTS

| | | | | |
|---|---|---|---|---|
| 2,932,901 | A * | 4/1960 | Salem et al. ................... | 34/393 |
| 4,635,684 | A * | 1/1987 | Hintsch ....................... | 139/1 R |
| 5,452,590 | A * | 9/1995 | Vigili ............................... | 66/8 |
| 5,642,758 | A * | 7/1997 | Palau et al. .................... | 139/57 |
| 5,647,402 | A * | 7/1997 | Palau et al. .................. | 139/1 R |
| 6,050,305 | A * | 4/2000 | Braun et al. ................. | 139/455 |
| 6,058,983 | A * | 5/2000 | Bourgeaux et al. .......... | 139/455 |
| 6,237,213 | B1 * | 5/2001 | Braun et al. ................... | 29/596 |
| 6,293,315 | B1 * | 9/2001 | Froment et al. ............. | 139/55.1 |
| 6,397,897 | B2 * | 6/2002 | Fumex ......................... | 139/57 |
| 6,834,681 | B2 * | 12/2004 | Wahhoud .................... | 139/1 E |
| 6,863,091 | B2 * | 3/2005 | Wahhoud ................. | 139/435.1 |
| 7,040,352 | B2 * | 5/2006 | Dagois et al. ................. | 139/59 |
| 2004/0261882 | A1 * | 12/2004 | Dagois et al. ................. | 139/59 |
| 2005/0241718 | A1 * | 11/2005 | Froment ...................... | 139/91 |
| 2007/0035129 | A1 * | 2/2007 | Chappaz et al. ............. | 285/308 |

FOREIGN PATENT DOCUMENTS

| | | |
|---|---|---|
| DE | 19532976 A1 | 3/1997 |
| EP | 4096647 A2 | 5/2001 |
| EP | 1489208 A1 | 12/2004 |
| EP | 1741816 A2 | 1/2007 |

* cited by examiner

*Primary Examiner*—Bobby H Muromoto, Jr.
(74) *Attorney, Agent, or Firm*—Dowell & Dowell P.C.

(57) ABSTRACT

A weaving loom having self-contained assemblies that operate pulling systems for controlling heddle frames wherein each assembly includes at least one electric motor housed in a casing and at least one motor control unit having an electrical circuit for controlling electric power to the electric motor and wherein the self-contained assembly also includes a support on which the motor control unit is mounted and the support having at least one cooling duct extending there through. The self-contained assembly having damping elements providing a damping effect between the support and the electric motor.

14 Claims, 4 Drawing Sheets

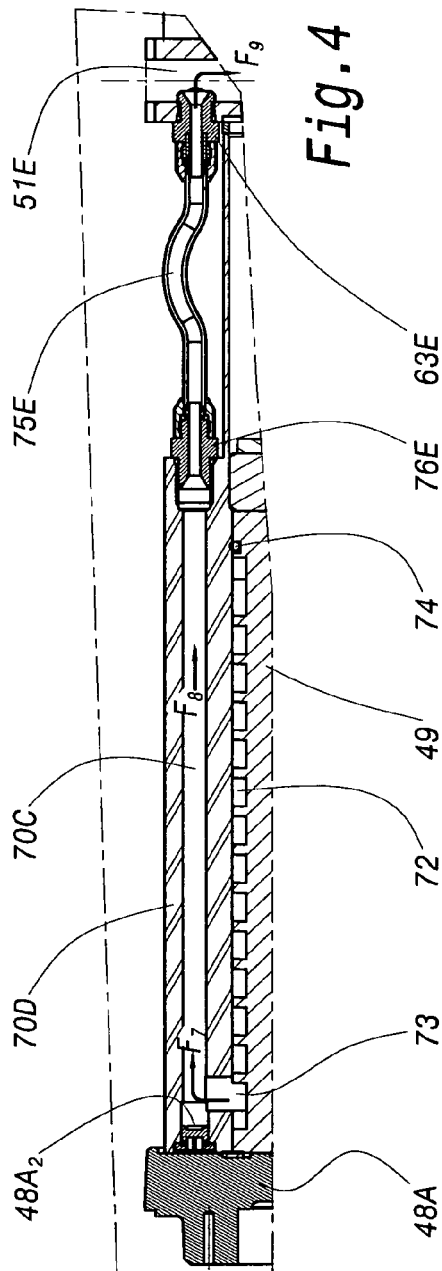
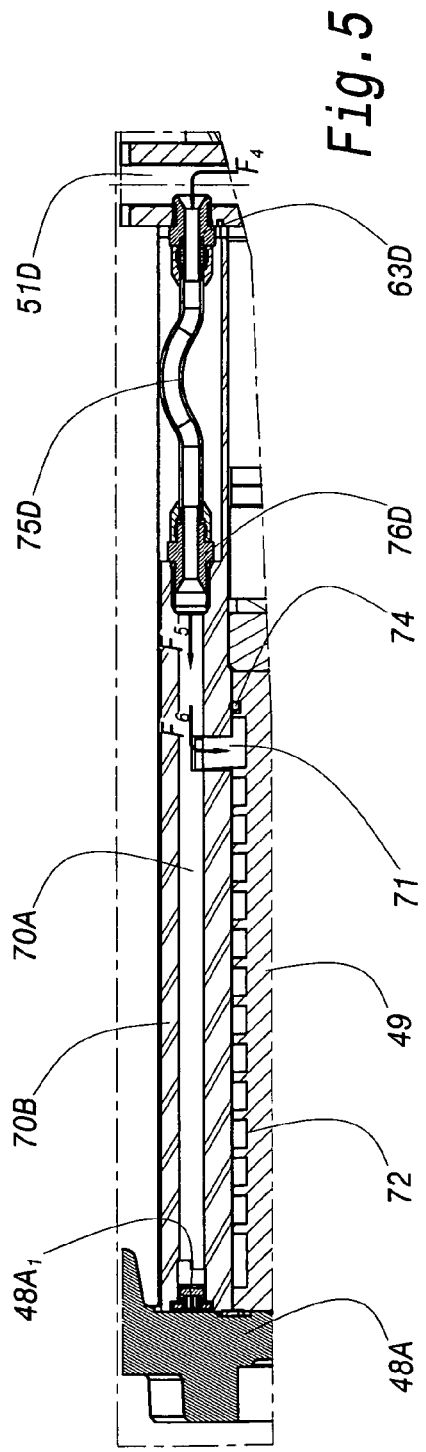

SHED-FORMING DEVICE INCORPORATING ELECTRIC MOTOR UNITS AND WEAVING LOOM EQUIPPED WITH SUCH A DEVICE

BACKGROUND OF THE INVENTION

1. Field of the Invention

The present invention relates to a shed-forming device for a weaving loom incorporating at least one electrical actuator. The invention also relates to a weaving loom comprising such a device.

2. Brief Description of the Related Art

On a loom, it is known to use a set of heddle frames to form the shed. These heddle frames are driven by a pulling system which may itself be operated by a dobby or, alternatively, by means of electrical actuators. FR-A-2 856 412 thus describes a shed-forming device, the pulling system of which is connected, for each heddle frame, to an electrical actuator undergoing a rotary oscillating movement.

The electrical actuator includes in this case a self-contained assembly incorporating an electric motor surrounded by its casing. To receive the electric power on the one hand and to exchange electrical signals with control/drive means on the other, the electrical actuator is provided with two connectors intended to be respectively connected to a line for supplying electric current and to a line for transmitting signals to control/drive means via a panel. Thus, the control/drive means that transmit the electric power to the motor and exchange signals are located at some distance from the motor, for example within a control cabinet common to several actuators.

A shed-forming device comprises several heddle shafts or heddle frames, generally around twenty, which have to be operated individually. To do this, the drawing system of the device must be connected, for each heald shaft or heddle frame, to an actuator associated with remote control/drive means transmitting the power and controlling the control/drive signals by electrical circuits that must be independent of one another. This means installing, between the control cabinet and the actuators, as many electrical power and signal lines for the control/drive as there are actuators. This makes the connection operations lengthy, and therefore expensive. In addition, this requires particular measures to be taken to avoid electromagnetic interference on the control/drive signals by the currents flowing in the many neighbouring electrical lines.

Furthermore, the distance separating an actuator from its control/drive means involves the use of two cooling systems for protecting, on the one hand, the control/drive means and, on the other hand, the motor from the effects of excessive heating. Now, having to fit two cooling circuits for the flow of heat-transfer fluids also increases the manufacturing cost of the installation.

U.S. Pat. No. 6,909,210 describes an electrical actuator which is dedicated to a motor vehicle and comprises an electric motor unit housed in a casing between two flanges. The rear flange furthermore includes an electrical circuit and has a cooling circuit. Each of the flanges houses a rolling bearing, for forming a bearing for the drive shaft. The rear flange is therefore linked closely and directly to the motor unit via a rolling bearing. This rear flange therefore undergoes vibrations and heating generated or transmitted by the rolling bearing in service. This may eventually risk degrading the integrity of the flange on the motor unit and therefore the sealing of the cooling circuit. Such an actuator cannot therefore be included in a shed-forming device since the vibrations therefrom are of particularly high frequency and intensity.

Furthermore, since the flanges are closely linked to the motor unit, assembly and disassembly of the actuator, for fitting it or maintaining it, are relatively expensive.

SUMMARY OF THE INVENTION

The object of the present invention is in particular to remedy these drawbacks by proposing a shed-forming device in which each electrical actuator does not require the use of two cooling systems nor of specific electrical lines, while limiting electromagnetic interference, and therefore the risks of failure.

For this purpose, the invention relates to a shed-forming device for a weaving loom equipped with several heddle frames and comprising a pulling system connected, for each heddle frame, to a self-contained assembly intended to operate the pulling system and comprising at least one electric motor unit housed in a casing and at least one electrical circuit intended to transmit in particular the electric power to the electric motor unit. The self-contained assembly also includes a support placed close to the electric motor unit, the electrical circuit being mounted on the support, while the support has at least one cooling duct for the flow of a heat-transfer fluid. In addition, the self-contained assembly includes damping elements placed so as to provide a flexible link between the support and the electric motor unit.

In other words, the shed-forming device has an electrical circuit attached to the associated electric motor via its support, which device also allows the flow of a heat-transfer fluid for cooling the self-contained assembly.

According to advantageous features of the invention:

the support is fitted onto one axial end of the casing;

the support has two cooling ducts and the electric motor unit is equipped with a cooling circuit connected to the cooling ducts;

the cooling circuit comprises a helical channel provided between the casing and a skirt surrounding the electric motor unit;

the damping elements comprise damping mounts each extending between an internal radial surface of the casing and a surface integral with the support;

the damping elements include a seal made of elastic material and placed between the support and an axial surface of the casing;

the cooling circuit is connected to the ducts via hoses;

the support consists of a section piece, the central part of which defines two through-holes extending parallel to the longitudinal axis of the section piece and each forming a cooling duct;

the support has two lateral flanges extending transversely to the longitudinal axis of the section piece and the support is furthermore equipped with two plates and with a cover that are capable of covering the free sections of the section piece, so as to form a case for enclosing the electrical circuit;

the support has, in projection in a plane perpendicular to the rotation axis of the motor unit, smaller dimensions than those of the face of the motor unit that carries the output shaft;

the self-contained assembly comprises two motor units mounted side by side with their rotation axes approximately parallel to each other, the support and the electrical circuit being common to the motor units; and the electric motor unit comprises a brushless synchronous motor, the electrical circuit being capable of commutating the electric currents intended for actuating the motor.

Moreover, the invention relates to a weaving loom comprising at least one shed-forming device as explained above and comprising several self-contained assemblies.

According to one advantageous feature, the self-contained assemblies are connected in series, on one side, to a single electric power supply line and, on the other side, to a single common communication cable.

BRIEF DESCRIPTION OF THE DRAWINGS

The invention will be more clearly understood and other advantages thereof will also become apparent in the light of the following description of a shed-forming device according to the invention, given solely by way of example and with reference to the appended drawings in which:

FIG. 4 is a partial sectional view in the plane $P_C$ in FIG. 1, showing a detail of the device of FIG. 1;

FIG. 5 is a partial sectional view in the plane $P_B$ in FIG. 1, showing a detail of the device of FIG. 1.

DESCRIPTION OF THE PREFERRED EMBODIMENTS

Figure 1:
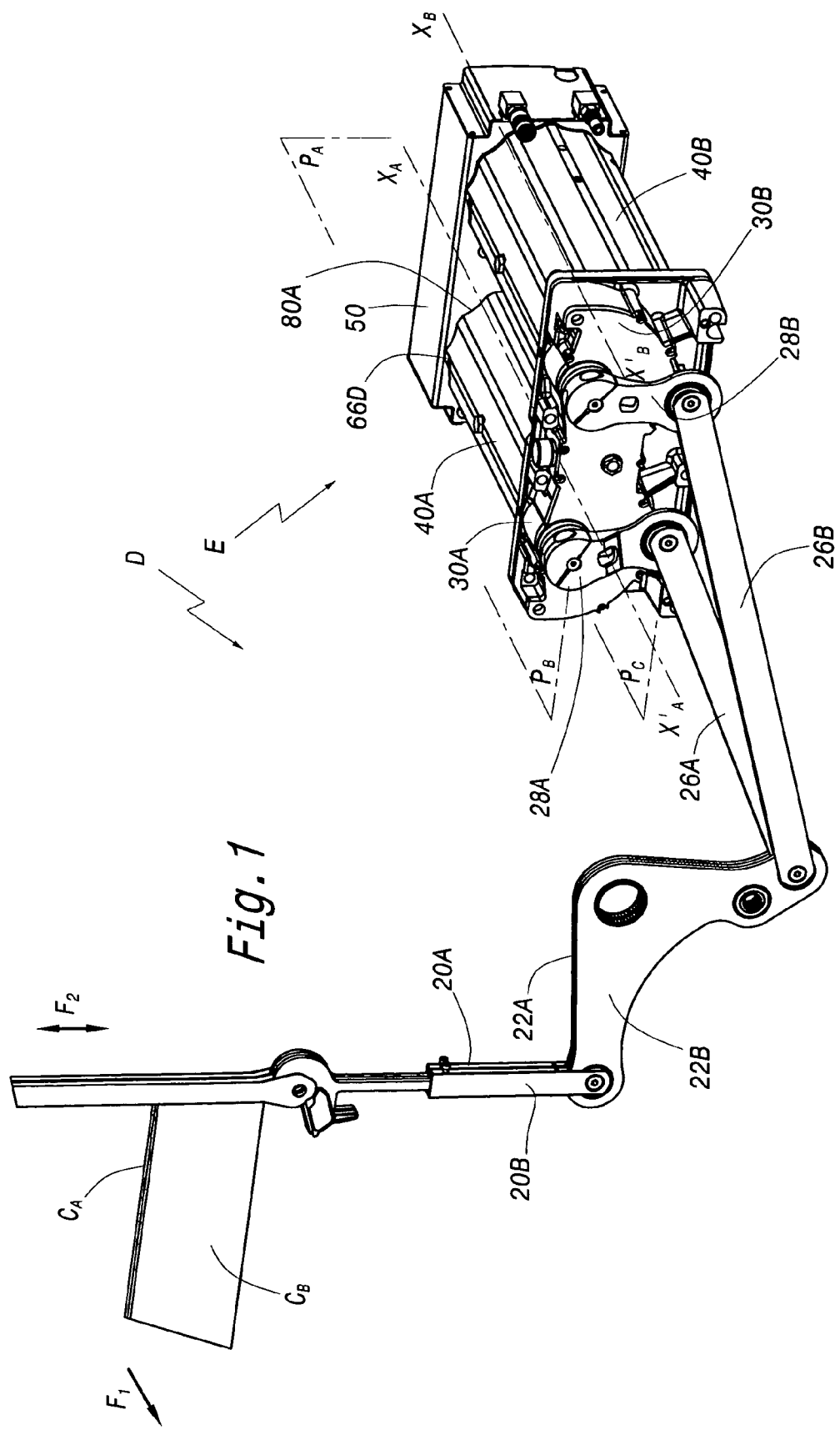
FIG. 1 is a perspective view of a shed-forming device according to a first embodiment of the invention, in which a self-contained assembly of the device incorporates two electric motors.

The shed-forming device shown in FIG. 1 comprises several heddle frames, two of which are shown in this figure with the references $C_A$ and $C_B$. As is known per se, the frames $C_A$ and $C_B$ are equipped with heddles (not shown), through the respective eyes of which warp yarns are passed, these yarns being shown symbolically by the arrow $F_1$ indicating their direction of movement along a direction perpendicular to the plane of the frames.

Each frame $C_A$ or $C_B$ is driven in a vertical oscillatory movement in the direction of the double arrow $F_2$. This movement is controlled in particular by distal connecting rods 20A and 20B which are attached in the lower part of the frames $C_A$ and $C_B$ respectively, and also to two oscillating levers 22A and 22B. The levers 22A and 22B are connected, by proximal connecting rods 26A and 26B respectively, to cranks 28A and 28B which are mounted on rotary drive mechanisms 30A and 30B respectively, constituting the respective output members of two electric motors each housed in a motor unit 40A or 40B.

In the embodiment illustrated in FIG. 1, the two motor units 40A and 40B are incorporated side by side in a self-contained assembly E, which further includes a case 50 common to the motor units 40A and 40B. The motor unit 40B here is identical to the motor unit 40A, so that the following description of the latter can be directly transposed thereto.

Figure 2:
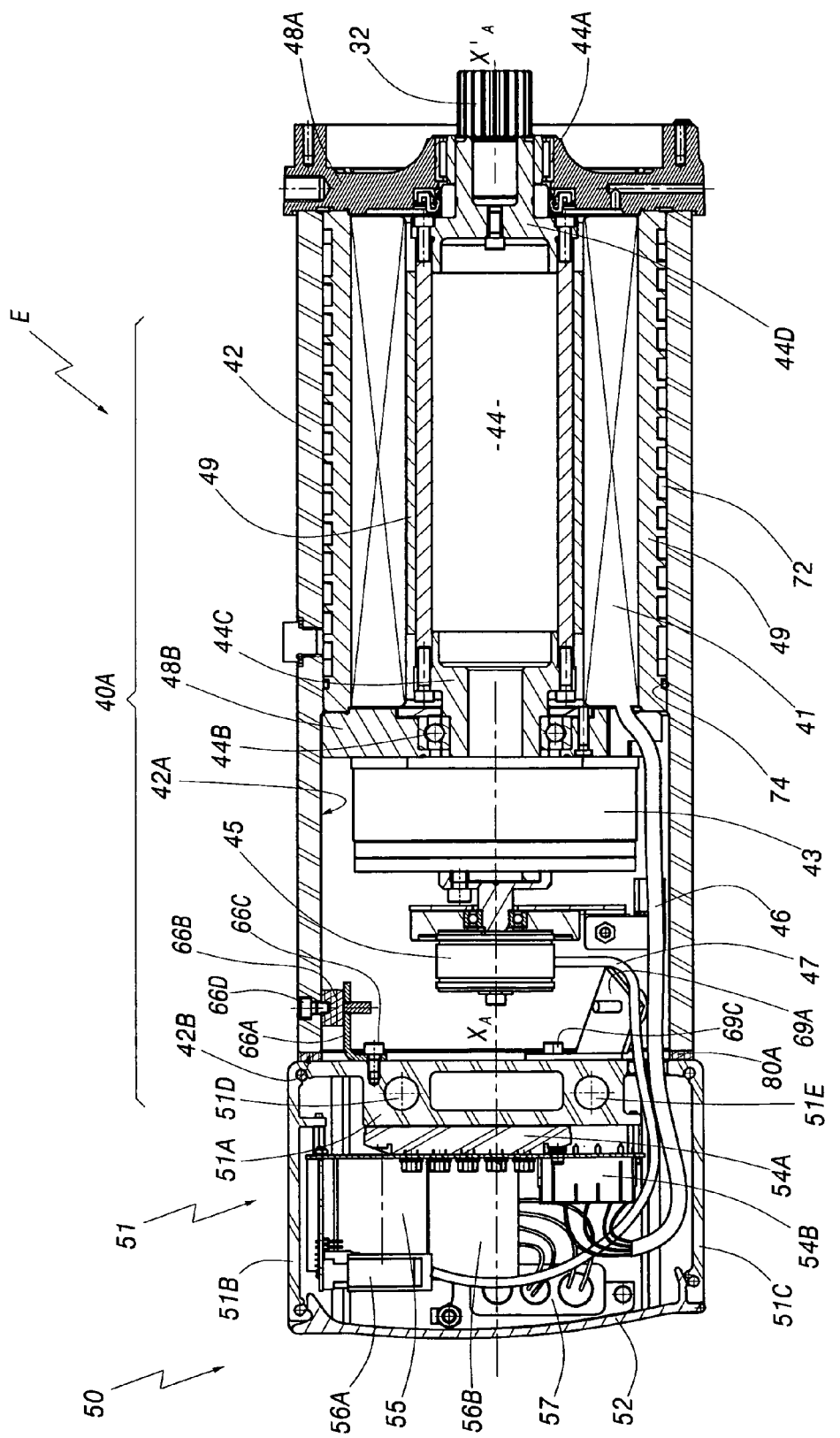
FIG. 2 is a partial sectional view in the plane $P_A$ of the self-contained assembly of the device shown in FIG. 1.

As shown in FIG. 2, the motor unit 40A is housed in a casing 42 of elongate cylindrical shape of axis $X_A$-$X'_A$ coincident with the rotation axis of a rotor 44 belonging to the motor unit 40A. Here, this is a brushless synchronous motor. An external flange 48A is fastened to the casing 42 so as to close off a first axial opening thereof. A generally annular internal flange 48B is fixedly mounted inside the casing 42 and coaxially therewith. The rotor 44, provided with magnets 49, is rotationally supported around its axis $X_A$-$X'_A$ relative to the external 48A and internal 48B flanges respectively by means of bearings 44A and 44B. It is surrounded by a set of laminations and coils constituting a stator 41, in the form of a hollow cylinder coaxial with the axis $X_A$-$X'_A$. The external 48A and internal 48B flanges are fixedly mounted to the casing 42.

Beyond its central part located between the bearings 44A and 44B, the rotor 44 is extended by a cap 44C so as to cooperate with an electrically controlled braking system 43 known per se. The cap 44C terminates in a shaft cooperating with a sensor 45 capable of emitting electrical signals representative of the position of the moving members of the motor. The sensor 45 consists here of a resolver intended to measure the rotation angle of the rotor 44. At its end 44D on the opposite side from the cap 44C, the rotor 44 is fastened to a pinion 32, which constitutes the output shaft transmitting a rotary movement to the drive mechanism 30A.

The axial end of the casing 42 on the opposite side from the opening closed off by the external flange 48A is covered by the case 50 common to the motor units 40A and 40B. The case 50 comprises a support 51 of generally U-shaped cross section, the free ends of the branches of which are joined by a cover 52 and the lateral faces of which are covered by plates 53A and 53B which are visible in FIG. 3. The plates 53A and 53B are removably assembled to the support 51, for example by means of bolts 53C. The case 50 thus defines a closed hollow volume in which the electrical components needed to operate the motor can be housed. The support 51 is therefore independent of the motor units 40A and 40B, so that they can be assembled and disassembled separately, making fitting and maintenance easier.

More precisely, the support 51 is made up of a section piece having a central part 51A from which two lateral flanges 51B and 51C extend transversely. In this case, the section piece forming the support 51 is made of aluminium. The external face of the central part 51A is placed on the end of the casings 42 of the motor units 40A and 40B opposite the axial opening located facing the cap 44C. The support 51 extends along a direction Y-Y' orthogonal to the respective rotation axes $X_A$-$X'_A$ and $X_B$-$X'_B$ of the motor units 40A and 40B.

The case 50 houses a control/drive unit 55 intended for determining and delivering the electric power for the various stator coils of the motor units 40A and 40B according to the position of each rotor 44, on the basis of signals coming from each sensor 45 and from information external to the self-contained assembly E. This control/drive unit 55 is an electronic card that includes an electrical circuit 54A mounted on the internal face of the central part 51A.

The electrical circuit 54A is electrically connected to a power cable 46 via a connector 54B. The circuit 54A may thus supply the coils of the stators 41 with electric current. Owing to the case 50 being assembled on the casing 42, the support 51, provided with the circuit 54A, is placed close to the motor unit 40A.

Moreover, the control/drive unit 55 is electrically connected to the sensor 45 via a cable 47 and via an internal connector 56A. In addition, said unit may be electrically connected to an external control/drive system (not shown) via an external connector 56B. This external connector 56B receives a bundle of electrical lines L passing through the lateral plate 53A via a gland 57. The electrical line L also possesses an electric power cable connected to the external connector 56B.

Thus, the control/drive unit 55 is capable of supplying electric power to the coils of the stators from an external power supply that may be common to several control/drive units. It takes into account the position of the rotors which it controls and external information such as the intended amplitude of the movement of the frames or the position of the weaving loom in its cycle.

Since the motor is a brushless synchronous motor, the control/drive unit 55 includes an electronic circuit capable of commutating the electric currents intended for actuating the motor. This circuit constitutes the variable-speed drive of the motor. Other types of electric motors may also carry out the invention.

The control/drive unit 55 also controls the braking system 43 via the cable 47 and the internal connector 56A.

The central part 51A is pierced by two openings 65A and 65B through which the power cable 46 and the communication cable 47 are passed, these cables connecting the motor units 40A and 40B to the electrical circuit housed in the case 50. The electrical circuit, comprising the circuit 54A and the unit 55 and housed in the case 50, may thus control the operation of the motor unit 40A, and also that of the motor unit 40B in so far as the latter is equipped with electrical cables and components similar to those described above.

When the motor units 40A and 40B are supplied with electric current, the power components of the circuit 54A may heat up considerably, it being desirable to temper this in order to preserve them. For this purpose, the support 51 has two holes passing right through it, these forming cooling ducts 51D and 51E for the flow of a heat-transfer fluid, such as water. The ducts 51D and 51E extend in the direction of production of the section piece, that is to say along its longitudinal axis Y-Y'. Here the ducts are circular and of constant diameter. The ducts 51D and 51E are made in the thickness of the central part 51A so as to lie close to the circuit 54A, the components of which have to be cooled.

The plates 53A and 53B have two notches positioned at the ducts 51D and 51E respectively, so as to be clear of the ends thereof. The ends of the ducts 51D and 51E located facing the plate 53A are closed off by plugs 61D and 61E respectively. The opposite ends, located facing the plate 53B, are equipped, respectively, with a first inlet coupler 62D and with a first outlet coupler 62E. The first couplers 62D and 62E are each intended to receive a hose (not shown) for supplying and removing, respectively, the heat-transfer fluid propelled by a pump (not shown).

The motor units 40A and 40B also have elements that heat up in operation and have to be cooled, such as the coils of the stator 41. To do this, the motor units are each equipped with a cooling circuit, shown in detail in FIGS. 4 and 5, which is connected to the ducts 51D and 51E. The cooling circuit for the motor unit 40A comprises a helical channel 72 provided between the casing 42 and a skirt 49 that surrounds the stator 41. To delimit the channel 72, the external surface of the skirt 49 has a square-pitched thread.

The heat-transfer fluid in the channel 72 is supplied by a straight duct 70A, parallel to the axis $X_A$-$X'_A$, drilled in a radial excrescence 70B of the casing 42. An inlet hole 71 made in the excrescence 70B allows the heat-transfer fluid to penetrate into the upper part of the helical channel 72. A straight duct 70C, parallel to the axis $X_A$-$X'_A$, drilled in a radial excrescence 70D of the casing 42, allows the heat-transfer fluid to be removed from the channel 72 via an outlet hole 73 provided in the lower part of the radial excrescence 70D. The radial excrescence 70D extends along the casing 42 on a longitudinal part located facing the stator 41.

Two plugs 48$A_1$ and 48$A_2$ are screwed into the ends of the channels 70A and 70C so as to seal them. The cooling circuit may be fitted with other sealing elements, such as an O-ring seal 74 housed in a groove machined in the external radial surface of the skirt 49.

Those ends of the straight ducts 70A and 70C which are on the opposite side from the external flange 48A are equipped with an inlet fitting 76D and with an outlet fitting 76E respectively, to which an inlet hose 75D and an outlet hose 75E are connected respectively. At their other end, the hoses 75D and 75E are connected to the ducts 51D and 51E of the support 51 respectively via two second couplers 63D and 63E. The connection of the hoses 75D and 75E to each of the fittings 76D and 76E and to each of the second couplers 63D and 63E is carried out in a known manner, by pinching the walls of the hoses between a moveable part and a fixed part.

Figure 3:
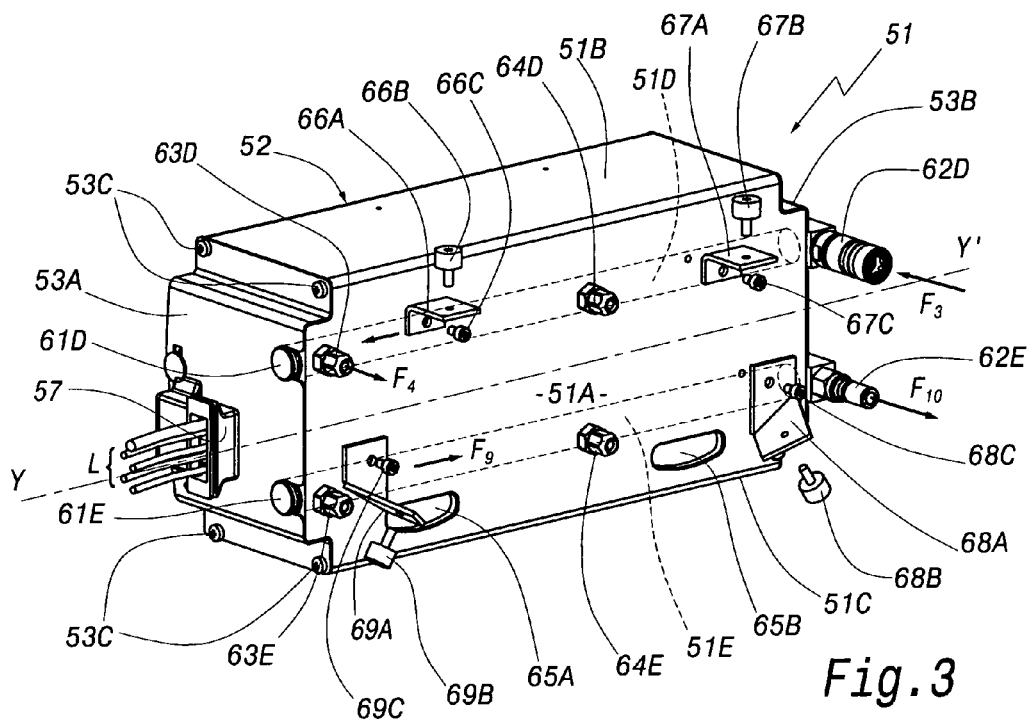
FIG. 3 is a perspective view of part of the self-contained assembly of the device of FIG. 1.

As shown in FIG. 3, the second couplers 63D and 63E form tap-offs close to those ends of the ducts 51D and 51E which are on the opposite side from the first couplers 62D and 62E respectively. Similarly, the motor unit 40B may be supplied by second couplers 64D and 64E forming tap-offs in the central parts of the ducts 51D and 51E respectively.

Thus, as indicated by the arrows $F_3$ to $F_{10}$ in FIGS. 3 to 5, the heat-transfer fluid enters via the first inlet coupler 62D and flows into the duct 51D, where it contributes to cooling the electrical circuit 54A. The heat-transfer fluid then flows via the tap-offs 63D and 64D towards the respective cooling circuits of the motor units 40A and 40B. From the tap-off 63D, the fluid then passes into the inlet hose 75D, into the straight duct 70A, into the inlet hole 71 and through the helical channel 72 where it contributes to cooling the hot parts of the motor unit 40A.

The heat-transfer fluid is then removed via the outlet hole 73, along the straight duct 70C and the hose 75E before emerging in the duct 51E via the tap-off formed by the second coupler 63E. The heat-transfer fluid then flows into the duct 51E where it also contributes to cooling the circuit 54A, before being removed via the first outlet coupler 62E.

The characteristics of the heat-transfer fluid, in particular its flow rate, are determined in particular according to the amount of heat that it is intended to extract.

The invention therefore makes it possible to affix the motor unit of the shed-forming device D to the control/drive unit for supplying it with power and for transmitting and processing the signals needed for its operation, while at the same time cooling the parts that heat up.

The electrical cables 46 and 47 connecting the electrical circuit 54A and the unit 55 to the motor unit 40A are relatively short, in particular shorter than the cables having the same functions in the known equipment, so that they offer little or no electromagnetic interference. In addition, the electrical circuits associated with the various actuators belonging to a shed-forming device according to the invention do not need to be individually connected to as many power sources and communication circuits are there are cables connected in parallel. On the contrary, the electric power and the communication signals may be respectively distributed in series in succession to each electrical actuator. This allows the number of electrical cables needed, and therefore the cost of the shed-forming device, to be considerably reduced.

In addition, owing to the closeness of the motor and the electrical circuits, those parts which heat up may be cooled by means of a heat-transfer fluid and a common cooling circuit. This allows the equipment cost and the installation cost of a weaving loom equipped with a shed-forming device according to the invention to be reduced.

Moreover, as shown in FIGS. 2 and 3, the self-contained assembly E includes damping elements placed so as to form a flexible link between the support 51 and each of the motor units 40A and 40B. The term "flexible link" is understood to mean a link that prevents or limits the transmission of vibrations from the motor unit or units to the case 50 and to the electrical circuit that is housed therein. Likewise, the term "damping" refers to the damping of these vibrations.

These damping elements comprise in particular damping mounts or anti-vibration mountings 66B, 67B, 68B and 69B which extend between the internal radial surface of the casing of the corresponding motor unit and brackets 66A, 67A, 68A and 69A fastened by screws 66C, 67C, 68C and 69C, respectively, to the external face of the central part 51A. Owing to their respective positions on the external face of the central part 51A, the brackets 68A and 69A are bent along an oblique line so as to match the cylindrical shape to the circular base of the internal radial surfaces, including the surface 42A, of the casings of the motor units 40A and 40B. For the same reason, the brackets 66A and 67A are bent along a straight line. Each mount 66B, 67B, 68B and 69B is slightly compressed between the corresponding bracket 66A, 67A, 68A and 69A and the surface 42A.

To keep it in position, each mount comprises a threaded rigid rod which is screwed into a tapped hole produced in the free tab of the corresponding bracket. On the opposite side from the rod, each mount has a tapped component into which a screw can be tightened, such as the screw 66D intended to keep the mount in place relative to the casing 42. The head of the screw 66D is housed in a recess made in the casing 42 so as not to project beyond the surface of the casing 42.

Moreover, the damping elements have an annular seal 80A made of elastic material, such as an elastomer, placed between the external face of the central part 51A of the support 51 and an axial annular surface 42B of the casing 42 formed by the terminal axial face on the opposite side from the external flange 48A.

Thus assembled, the damping elements absorb some of the vibratory energy generated by each motor when in operation and they limit the transmission thereof to the components of the electrical circuits housed in the case 50. Moreover, the hoses 75D and 75E have a specified curvature so as to accommodate the oscillating gap between the support 51 and the motor unit 40A due to the vibrations of the latter. There is therefore no risk of the hoses 75D and 75E becoming disconnected or of impeding the vibration damping by the flexible link between the case 50 and the motor 40A.

Moreover, the support 51 has, perpendicular to the axis $X_A$-$X'_A$, a cross section smaller in area than the size of the external flange 48A in a plane perpendicular to the axis $X_A$-$X'_A$. In projection in such a plane, the size of the support 51 is therefore limited by the size of the face of the actuator that carries the output shaft of the motor, that is to say the pinion 32. These dimensions make it possible to produce a compact shed-forming device in which the self-contained assemblies actuating the various heald frames or heddle shafts are juxtaposed. This compactness also results from the fact that the various actuators may be supplied in series by a single electric power line and a single communication cable common to all the self-contained assemblies, as explained above.

In addition, the shed-forming device may be made more compact by using a single case 50 for powering, driving and controlling two motor units 40A and 40B, as shown in FIGS. 1 to 5.

Figure 6:
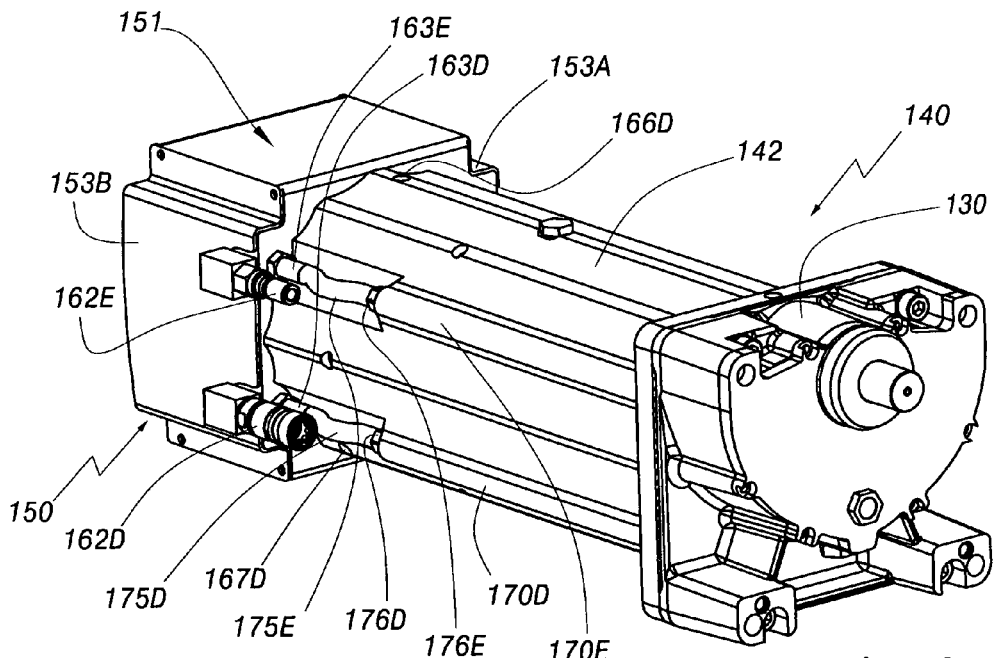
FIG. 6 is a perspective view of a self-contained assembly of a shed-forming device in accordance with a second embodiment of the invention.

However, it is possible to use only an individual case for controlling a single motor unit. This second embodiment is illustrated by FIG. 6 in which the numerical references of the corresponding elements of FIGS. 1 to 5 are increased by 100. Thus, identified in FIG. 6 are the motor unit 140, the drive mechanism 130 associated with the output shaft of the motor, the case 150 and its support 151, the lateral plates 153A and 153B, the casing 142, the radial excrescences 170D and 170E through which are pierced straight channels for the flow of a heat-transfer fluid, the hoses 175D and 175E and their second couplers 163D, 163E, 176D and 176E, the first couplers 162D and 162E and two screws 166D and 167D for the flexible link between the motor unit 140 and the case 150. Instead of having two screws such as 67D like the casing 42, the casing 142 has three screws distributed uniformly around the rotation axis of the motor at 120° to one another, including the screws 166D and 167D. As FIG. 6 shows, and similarly to the first embodiment illustrated in FIGS. 4 and 5, the hoses 175D and 175E are located on the external periphery of the casing 142. This arrangement allows easy access to these hoses 175D and 175E, thereby facilitating the operations of separating the case 150 from the motor unit 140.

The composition of the electrical circuit 54A, namely the nature of its components and their arrangement, depends on the type of electric motor used. This also applies to the structure of the control/drive unit 55 which may be assimilated or integrated into the electrical circuit 54A. An electrical circuit within the meaning of the invention may therefore include any type of electrical component or electronic component, and even one or more electronic cards.

The invention claimed is:

1. In a shed forming device for a weaving loom equipped with several heddle frames and including a pulling system connected, for each heddle frame, to a self-contained assembly for operating the pulling system, the self-contained assembly comprising at least one electric motor unit housed in a casing and at least one motor control unit having an electrical circuit for controlling electric power to the at least one electric motor unit, wherein the self-contained assembly also includes a support placed close to the at least one electric motor unit, the at least one motor control unit having the electrical circuit being mounted on the support, the support having at least one cooling duct extending therethrough for the flow of a heat-transfer fluid and which at least one cooling duct is in heat exchange relationship with at least the electrical circuit, a cooling circuit in heat exchange relationship with the at least one electric motor unit, the cooling circuit communicating with the at least one cooling duct such that the flow of heat-transfer fluid is used to cool both the electrical circuit and the at least one electric motor unit, and the self-contained assembly including damping elements placed between the support and the casing of the at least one electric motor unit for reducing vibration between the at least one electric motor unit and the support.

2. The shed forming device according to claim 1, wherein the support is fitted onto one axial end of the casing.

3. The shed forming device according to claim 1, wherein the support has two cooling ducts and in that the cooling circuit is connected to the two cooling ducts.

4. The shed forming device according to claim 3, wherein the cooling circuit includes a helical channel provided between the casing and a skirt surrounding the electric motor unit.

5. The shed forming device according to claim 1, wherein the damping elements include damping mounts each extending between an internal radial surface of the casing and a surface integral with the support.

6. The shed forming device according to claim 1, wherein the damping elements include a seal made of elastic material and placed between the support and an axial surface of the casing.

7. The shed forming device according to claim 3, wherein the cooling circuit is connected to the two cooling ducts via hoses.

8. The shed forming device according to claim 3, wherein the support consists of a section piece, the section piece including a central part to which at least the electrical circuit is mounted and the two cooling ducts being formed as through-holes extending parallel to a longitudinal axis of the section piece.

9. The shed forming device according to claim 8, wherein the support has two lateral flanges extending transversely to the longitudinal axis of the section piece and also has two plates and a cover for covering free sections of the section piece, so as to form a case for enclosing the at least one motor control unit having the electrical circuit.

10. The shed forming device according to claim 8, wherein the support has, in projection in a plane perpendicular to a rotation axis of the motor unit, smaller dimensions than those of a face of the at least one motor unit that carries an output shaft.

11. The shed forming device according to claim 1, wherein the self-contained assembly includes two motor units mounted side by side so that rotational axes thereof are approximately parallel to each other, the support and the at least one motor control unit having the electrical circuit being common to the two motor units.

12. The shed forming device according to claim 1, wherein the at least one electric motor unit includes a brushless synchronous motor, the electrical circuit commutating electric currents for actuating the synchronous motor.

13. A weaving loom comprising a plurality of heddle frames and pulling systems connected, for each heddle frame, to a separate self-contained assembly for operating each pulling system, each self-contained assembly having at least one electric motor unit housed in a casing and at least one motor control unit having an electrical circuit for controlling electric power to the electric motor unit, wherein each self-contained assembly also includes a support placed close to the at least one electric motor unit, the at least one motor control unit having the electrical circuit being mounted on the support, the support having at least one cooling duct extending therethrough for the flow of a heat-transfer fluid and which at least one cooling duct is in heat exchange relationship with at least the electrical circuit, a cooling circuit in heat exchange relationship with the at least one electric motor unit, the cooling circuit communicating with the at least one cooling duct such that the flow of heat-transfer fluid is used to cool both the electrical circuit and the at least one electric motor unit, and each self-contained assembly including damping elements placed between the support and the casino of at least one electric motor unit for reducing vibrations between the at least one electric motor unit and the support.

14. The weaving loom according to claim 13, wherein the self-contained assemblies are connected in series, on one side, to a single electric power supply line and, on another side, to a single common communication cable.

* * * * *